US011884232B2

(12) United States Patent
Gaither (10) Patent No.: US 11,884,232 B2
(45) Date of Patent: Jan. 30, 2024

(54) SEATBELT ASSISTANCE SYSTEMS, VEHICLES, AND METHODS

(71) Applicant: Toyota Motor Engineering & Manufacturing North America, Inc., Plano, TX (US)

(72) Inventor: Geoffrey David Gaither, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA

( * ) Notice: Subject to any disclaimer, the term of this patent is extended or adjusted under 35 U.S.C. 154(b) by 0 days.

(21) Appl. No.: 17/842,594

(22) Filed: Jun. 16, 2022

(65) Prior Publication Data
US 2023/0406256 A1   Dec. 21, 2023

(51) Int. Cl.
*B60R 22/03* (2006.01)
*B60R 22/48* (2006.01)

(52) U.S. Cl.
CPC ............. *B60R 22/03* (2013.01); *B60R 22/48* (2013.01); *B60R 2022/485* (2013.01)

(58) Field of Classification Search
CPC ........ B60R 22/03; B60R 22/04; B60R 22/48; B60R 2022/485; B60R 22/201; G01G 19/4142
USPC ....................................................... 280/802
See application file for complete search history.

(56) References Cited

U.S. PATENT DOCUMENTS

| 4,722,552 | A  | * | 2/1988  | Gyoda  | B60R 22/04 280/802 |
| 4,741,557 | A  | * | 5/1988  | Jambor | B60R 22/03 297/481 |
| 4,993,748 | A  | * | 2/1991  | Jambor | B60R 22/20 280/808 |
| 5,788,282 | A  | * | 8/1998  | Lewis  | B60R 22/024 297/483 |
| 6,246,936 | B1 | * | 6/2001  | Murphy | G01G 19/4142 280/801.1 |
| 6,969,122 | B2 | * | 11/2005 | Sachs  | B60R 22/30 280/801.1 |
| 8,152,198 | B2 | * | 4/2012  | Breed  | B60R 21/01516 701/45 |
| 9,365,186 | B2 | * | 6/2016  | Gulash | G05D 1/0055 |
| 9,434,349 | B1 | * | 9/2016  | Perkins | B60R 22/03 |

(Continued)

FOREIGN PATENT DOCUMENTS

JP            5508746         6/2014

*Primary Examiner* — Paul N Dickson
*Assistant Examiner* — Caitlin Anne Miller
(74) *Attorney, Agent, or Firm* — SNELL & WILMER LLP (57) ABSTRACT

Systems, vehicles, and methods for seatbelt assistance. A system may include a sensor. The sensor may be configured to detect a physical property of a user sitting on a seat. The system may further include a motor. The motor may be configured to extend a seatbelt part towards a body center of the user. The system may further include an electronic control unit (ECU). The ECU may be coupled to the sensor and the motor. The ECU may be configured to receive the detected physical property of the user. The ECU may be further configured to prompt the motor to extend the seatbelt part towards the body center of the user based on the detected physical property of the user.

20 Claims, 8 Drawing Sheets

(56) References Cited

U.S. PATENT DOCUMENTS

| | | | |
|---|---|---|---|
| 9,637,083 B2 | 5/2017 | Schlittenbauer et al. | |
| 10,850,693 B1 | 12/2020 | Pertsel et al. | |
| 10,889,261 B1 | 1/2021 | Charopoulos et al. | |
| 11,167,719 B2 * | 11/2021 | Song | B60R 21/013 |
| 2013/0009391 A1 * | 1/2013 | Miller | B60R 21/18 |
| | | | 280/806 |
| 2019/0299895 A1 * | 10/2019 | Herbert | B60R 21/01554 |
| 2020/0180554 A1 * | 6/2020 | Song | B60R 21/013 |

* cited by examiner

SEATBELT ASSISTANCE SYSTEMS, VEHICLES, AND METHODS

BACKGROUND

1. Field

The present disclosure is directed to vehicle seatbelts, particularly, systems and vehicles providing seatbelt assistance and methods of using the same.

2. Description of the Related Art

Users (e.g., drivers and/or passengers) of vehicles may suffer from limited range of mobility or reach due to age, disability, injury, height, weight, body shape, and/or the like. Such users may have difficulty or be unable to reach the extender and/or the receiver of their seatbelts. Motorized seatbelt systems to date are able to extend the extender of the seatbelt towards the user for a predetermined distance. However, these systems do not account for user profiles or characteristics before extending the extender. Additionally, these systems do not adjust the extension distance, direction, or method based on user characteristics. As such, these systems cannot be personalized and provide adequate assistance for many users.

Therefore, there is a need for systems, vehicles, and methods for providing seatbelt assistance based on physical properties of users.

SUMMARY

Systems, vehicles, and methods for providing seatbelt assistance are disclosed herein. A sensor may detect a physical property of a user sitting on a vehicle seat. The physical property may include body shape or body size of the user. An electronic control unit (ECU) may receive the detected physical property of the user and actuate a motor to extend a seatbelt part towards the body center or closer to a front of the user. The seatbelt part may be a receiver or an extender of the seatbelt. After the seatbelt is buckled, the seatbelt part may automatically return to its original position.

The ECU may further associate the detected physical property of the user with a user profile and actuate the motor based on settings associated with the user profile. The user profile may include age or range of mobility of the user. The settings may be stored in a memory or a remote server. The settings may be determined by the ECU based on the user profile or by user input. The ECU may receive seat position data from another sensor and take into account the seat position when actuating the motor.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

The systems, vehicles, and methods described herein assist users (e.g., drivers, passengers, etc.) in buckling their seatbelts. The vehicle may include a seatbelt system for providing an aid to users in buckling their seatbelt. The seatbelt system may have a sensor to detect a physical property of a user sitting on a vehicle seat. The physical property may include body shape, body size, age, height, weight, and/or the like. The seatbelt system may further have a motor to extend a seatbelt part, such as a seatbelt extender or a seatbelt receiver, towards a body center or closer to a front of the user. The seatbelt system may further have an ECU coupled to the sensor and the motor. The ECU may receive the detected physical property of the user. Thereafter, the ECU may advantageously prompt the motor to extend the seatbelt part towards the body center or closer to a front of the user based on the detected physical property of the user.

The ECU may advantageously associate the detected physical property of the user with a user profile including age, range of mobility, disability, and/or injury of the user by example and prompt the motor to extend the seatbelt part towards the body center or the front of the user based on settings associated with the user profile. The settings may be advantageously determined by the ECU automatically or may be customized by user input. Further, the seatbelt system may advantageously automatically determine a position of the seat, communicate the position of the seat to the ECU, and have the ECU prompt the motor to extend the seatbelt part towards the body center of the user or the front of the user based on the position of the seat as well. The ECU can make all the determinations, adjustments and movements of the seatbelt part without any user interaction or touch by the user of the seatbelt system.

Figure 1:
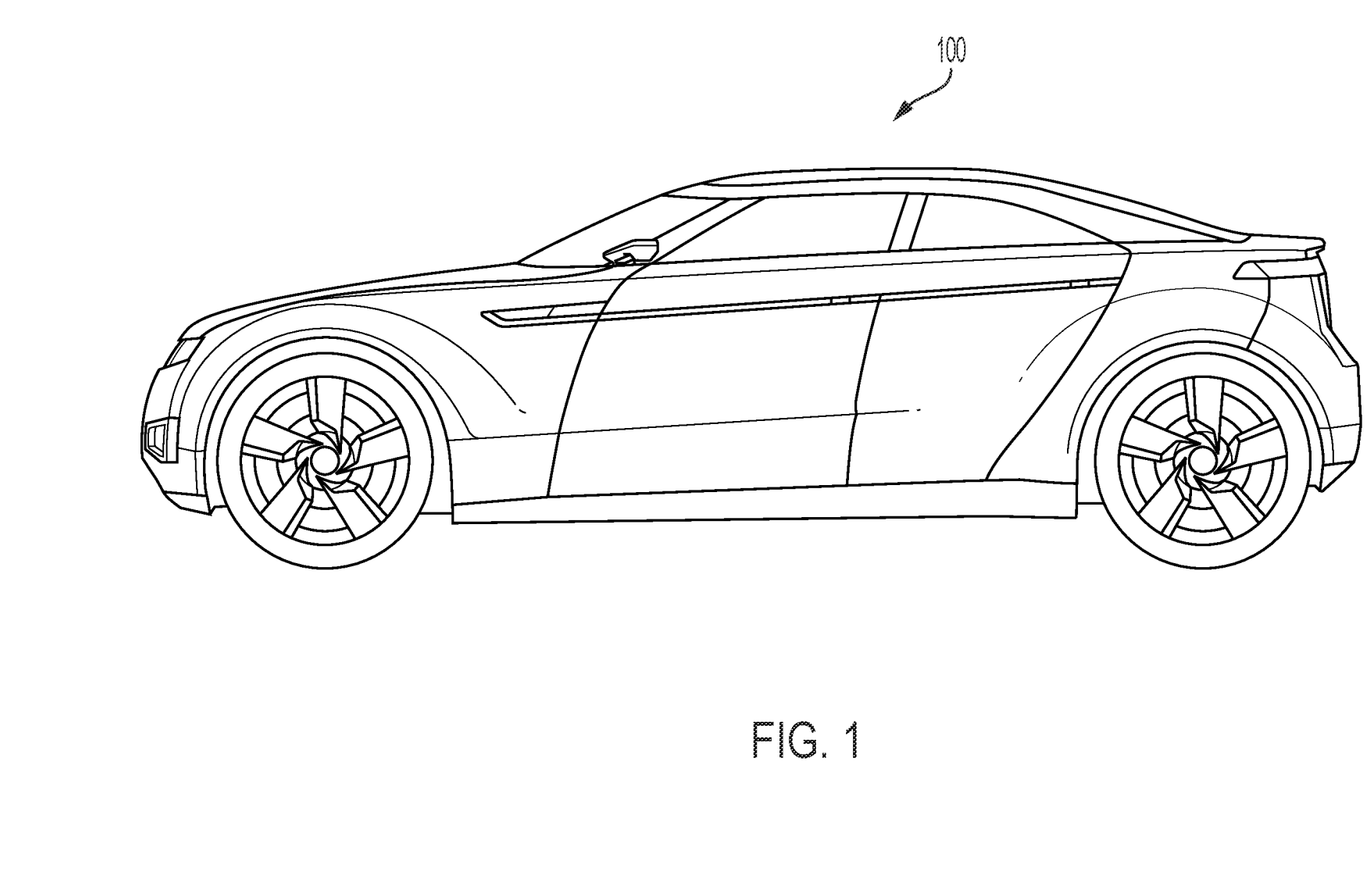
FIG. 1 illustrates a vehicle with seatbelt assistance according to an aspect of the present disclosure.

FIG. 1 illustrates a vehicle 100 with seatbelt assistance. The vehicle 100 is a conveyance capable of transporting a person, an object, or a permanently or temporarily affixed apparatus. The vehicle 100 may have an automatic or manual transmission. The vehicle 100 may be a self-propelled wheeled conveyance, such as a car, an SUV, a truck, a bus, a van or other motor or battery driven vehicle. For example, the vehicle 100 may be an electric vehicle, a hybrid vehicle, a plug-in hybrid vehicle, a fuel cell vehicle, or any other type of vehicle that includes a motor/generator.

Figure 2:
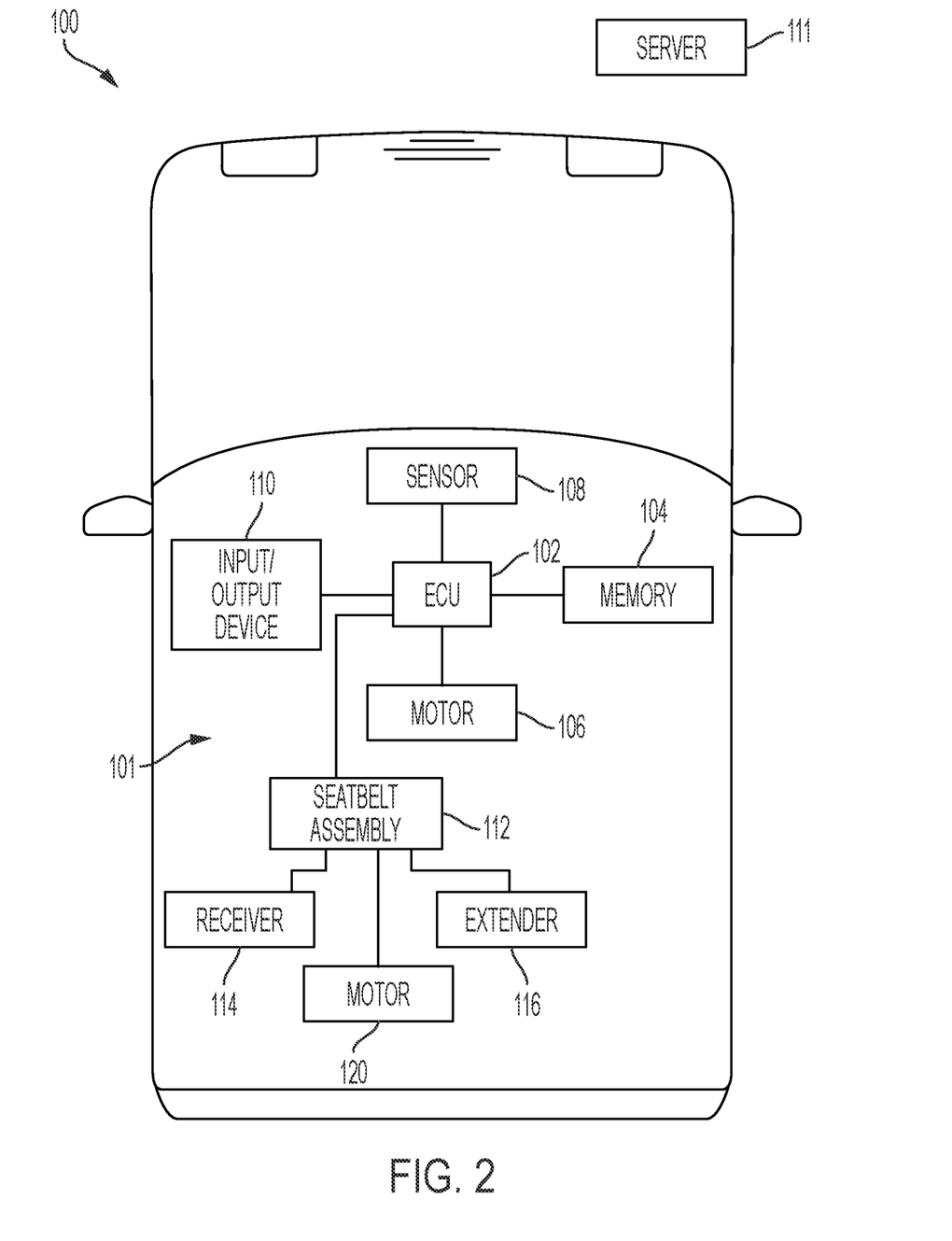
FIG. 2 illustrates a seatbelt assistance system according to an aspect of the present disclosure.
Figure 3:
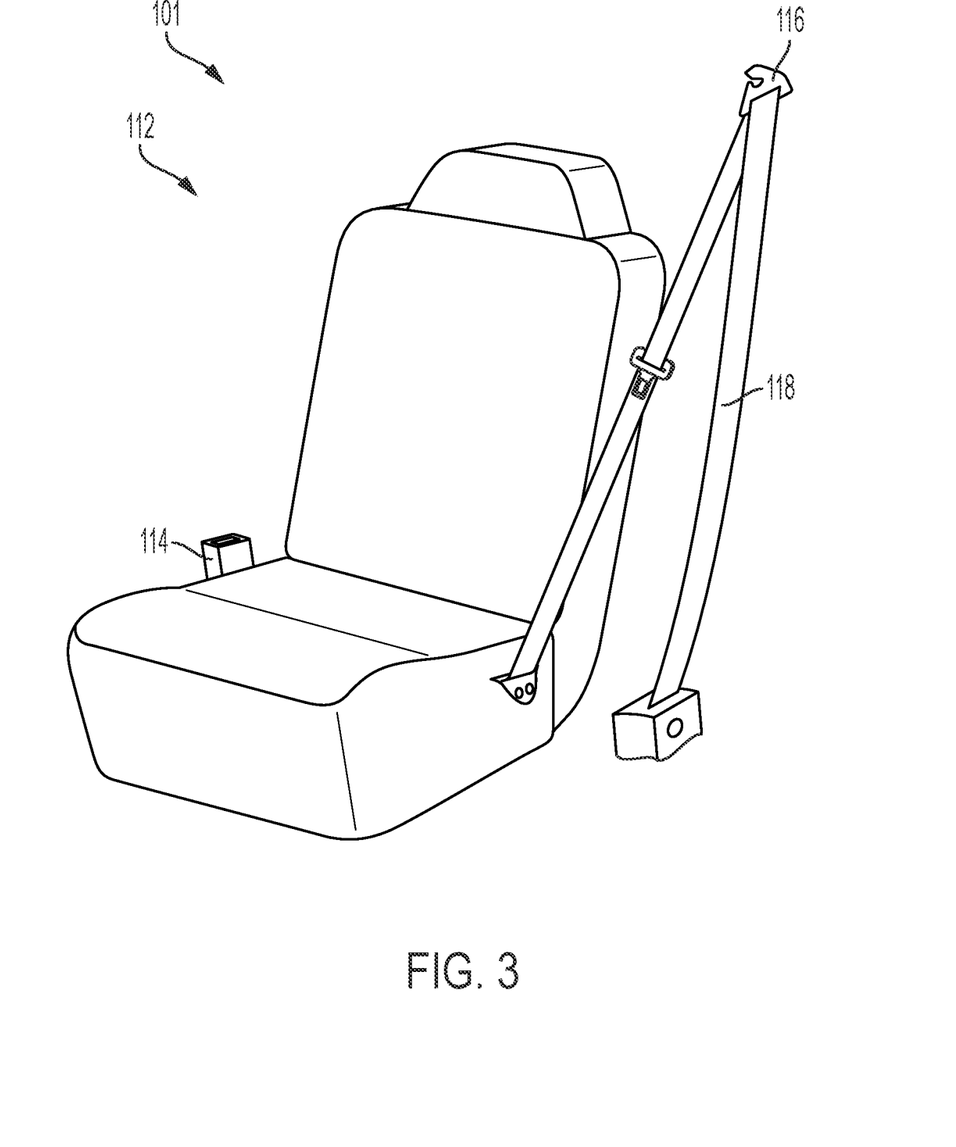
FIG. 3 illustrates a perspective view of a seat and a seatbelt of the vehicle of FIG. 1 according to an aspect of the present disclosure.

FIG. 2 illustrates a seatbelt assistance system. The vehicle 100 may include a seatbelt assistance system 101 for providing an aid to users in buckling their seatbelt. The seatbelt assistance system 101 may include an ECU 102, a memory 104, a power source 106, a sensor 108, and an input/output device 110.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be operated in an autonomous, semi-autonomous, or fully driver-operated state. In that regard, the vehicle 100 may be operated independently of driver control and, from time to time, without a person inside of the vehicle 100. The ECU 102 may facilitate such autonomous functionality.

The memory 104 may include any non-transitory memory and may store data usable by the ECU 102. For example, the memory 104 may store map data, may store instructions usable by the ECU 102 to drive autonomously, may store data indicating actions to be taken by the ECU during various environmental conditions, or the like. The memory 104 may store physical property data for when the passenger is located in the vehicle 100 and how the ECU 102 should command the certain components or systems accordingly. For example, the memory 104 may store the physical property data including that the passenger is of a certain profile. The ECU 102 may retrieve the physical property data and control vehicle components (e.g., a seatbelt, as explained further herein) based on the physical property data.

The power source 106 may include any one or more of an engine, a motor-generator, a battery, or a fuel cell circuit. The engine may convert a fuel into mechanical power for propelling the vehicle 100. In that regard, the engine may be a gasoline engine, a diesel engine, an ethanol engine, or the like. The motor-generator may convert the electrical energy stored in the battery (or electrical energy received directly from the fuel-cell circuit) into mechanical power usable to propel the vehicle 100. The motor-generator may further convert mechanical power received from the engine or from wheels of the vehicle 100 into electricity, which may be stored in the battery as energy and/or used by other components of the vehicle 100. In some embodiments, the motor-generator may include a motor without a generator portion and, in some embodiments, a separate generator may be provided.

The battery may store electrical energy. In some embodiments, the battery may include any one or more energy storage devices including a battery, a flywheel, a super capacitor, a thermal storage device, or the like. The fuel-cell circuit may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit may be stored in the battery and/or used by the motor-generator or other electrical components of the vehicle 100. In some embodiments, the vehicle 100 may include multiple fuel-cell circuits including the fuel-cell circuit.

The sensor 108 may include any sensor capable of detecting data corresponding to a physical property of a passenger of the vehicle 100. The sensor 108 may be coupled to the vehicle 100. For example, the sensor 108 may include a camera, a radar detector, a lidar detector, and/or any other image sensor capable of detecting light having any wavelength. In various embodiments, the sensor 108 may include an infrared (IR) sensor configured to detect the motion of the passenger. The sensor 108 may include one or multiple sensors which may be oriented to detect the physical property of the passenger.

The input/output device (I/O device) 110 may include any one or more input device such as a button, a keyboard, a mouse, a touchscreen, a microphone, or the like. The I/O device 110 may receive input from a user of the vehicle 100 such as a driver or a passenger. I/O device 110 may include any output device such as a speaker, a display, a touchscreen, or the like. In some embodiments and as further described below, the I/O device 110 may include a display overlaid on a vehicle window. The I/O device 110 may output data to a user of the vehicle such as a setting prompt.

In various embodiments, I/O device 110 may be considered a network access device configured to receive input from a remote device associated with a vehicle user and/or transmit output data to the remote device, where it may be output to a vehicle user. In that regard, the vehicle user may adjust vehicle settings using the remote device. The network access device may include any network access device capable of communicating via a wireless protocol. For example, the network access device may communicate via Bluetooth, Wi-Fi, a cellular protocol, vehicle to vehicle (V2V) communications, Zigbee, or any other wired or wireless protocol. The network access device may be referred to as a data communication module (DCM) and may communicate with any device on the vehicle 100 and/or any remote device. For example, the network access device may communicate with at least one of a remote server 111 (such as a cloud server or other central server) or a remote device (such as a mobile telephone, a laptop, a tablet, a desktop computer, a PDA, or the like).

Figure 4:
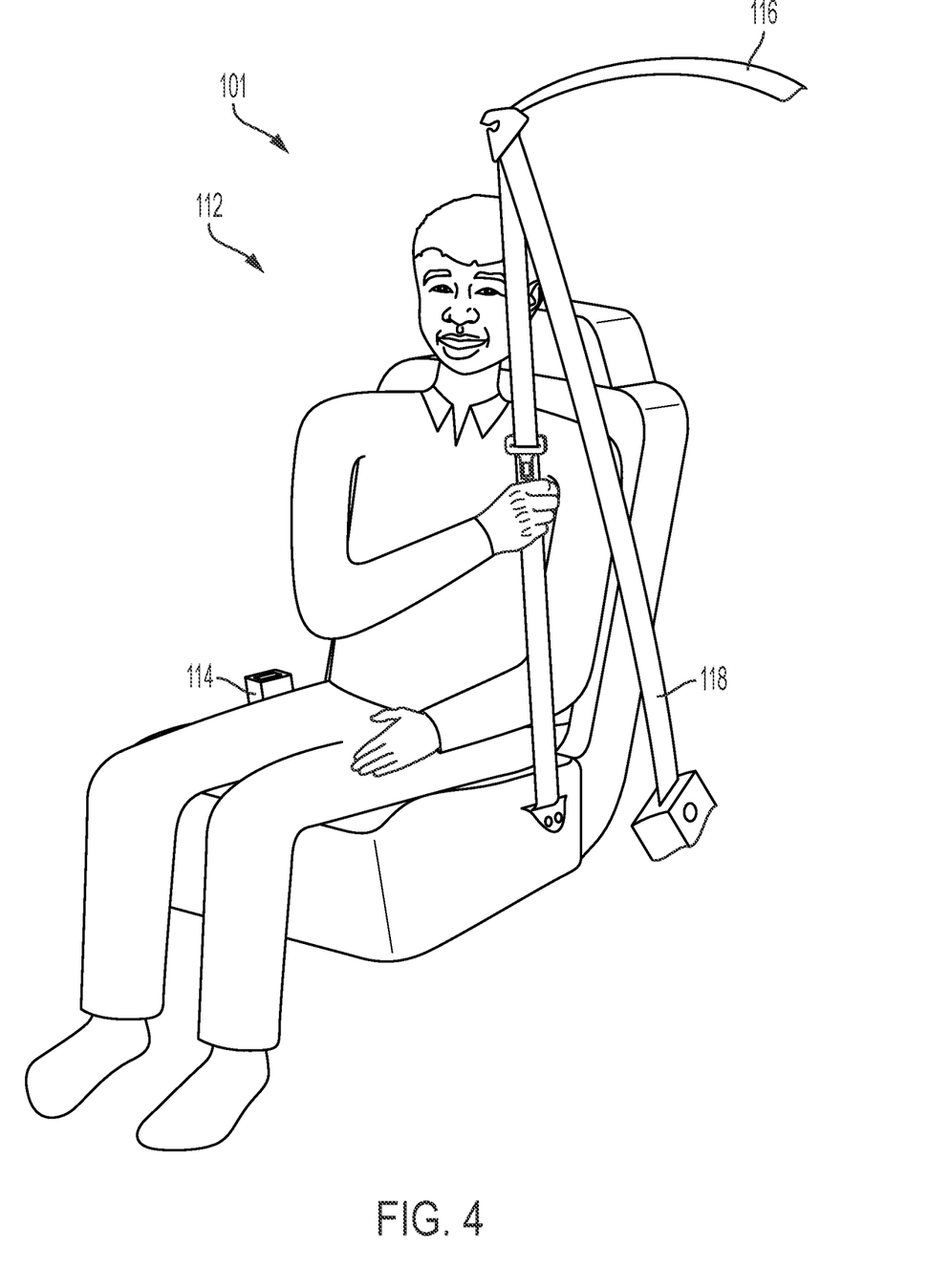
FIG. 4 illustrates a perspective view of a seatbelt extender extending towards a user according to an aspect of the present disclosure.
Figure 5:
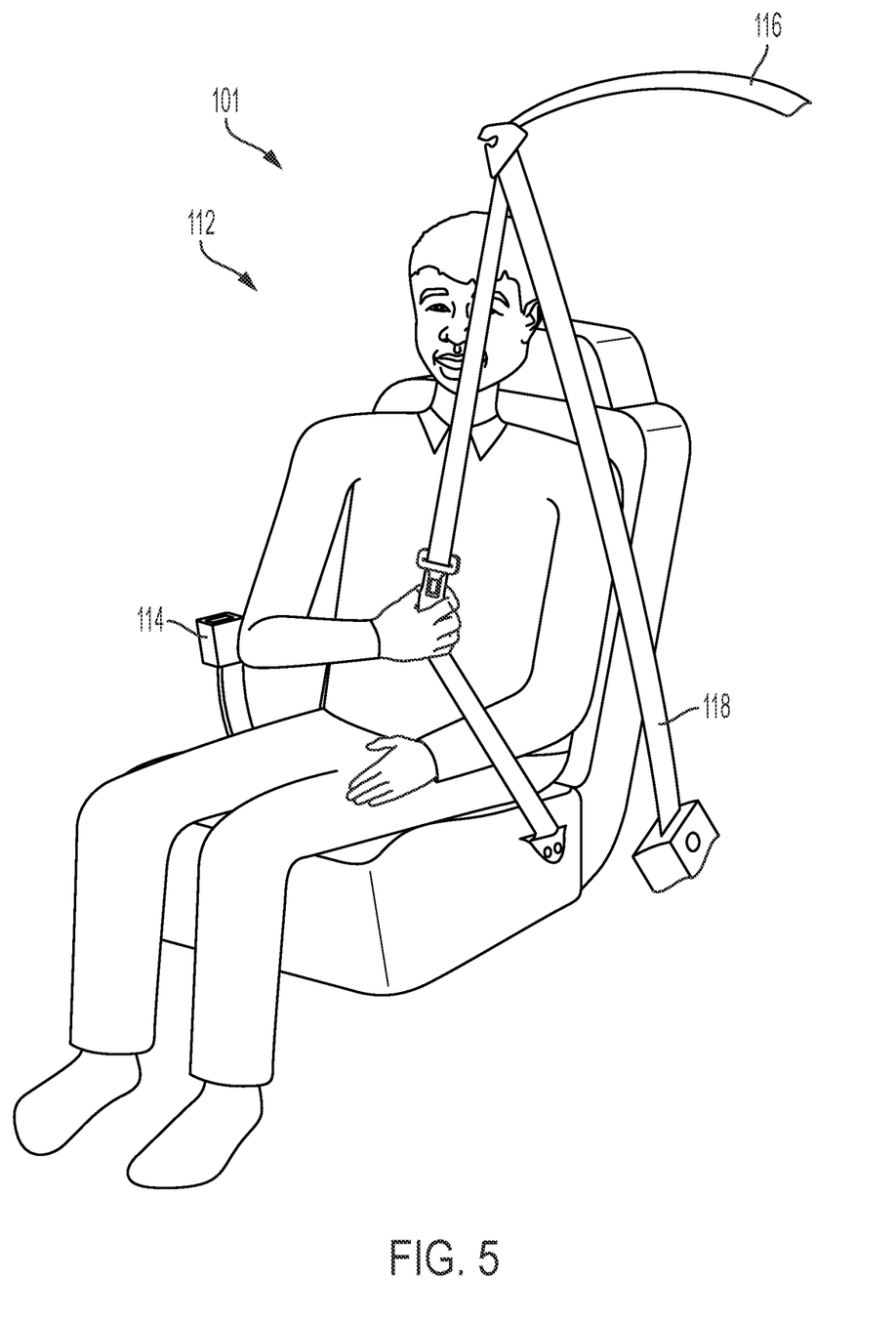
FIG. 5 illustrates a perspective view of a seatbelt receiver extending towards the user according to an aspect of the present disclosure.
Figure 6:
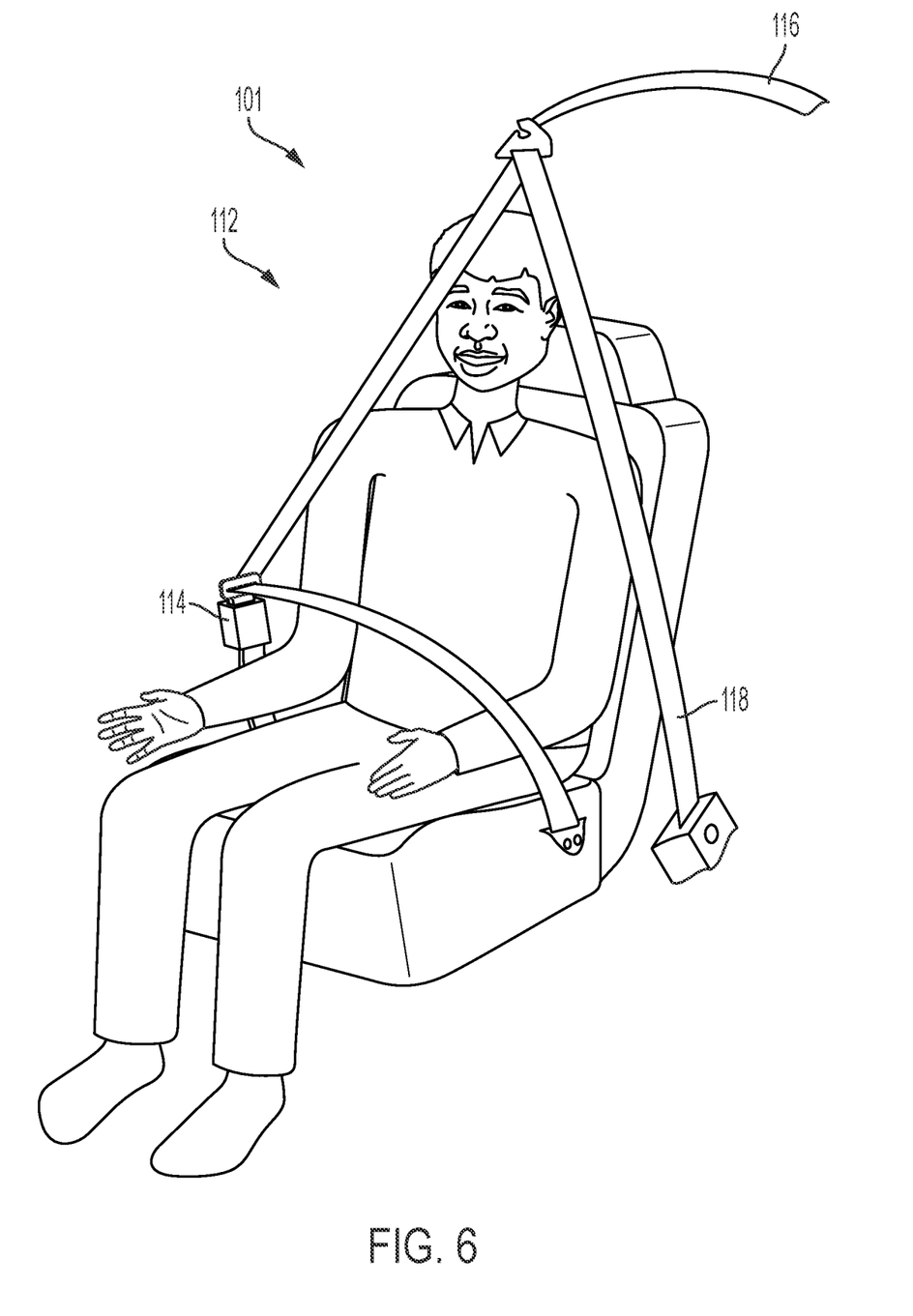
FIG. 6 illustrates a perspective view of the seatbelt being buckled according to an aspect of the present disclosure.
Figure 7:
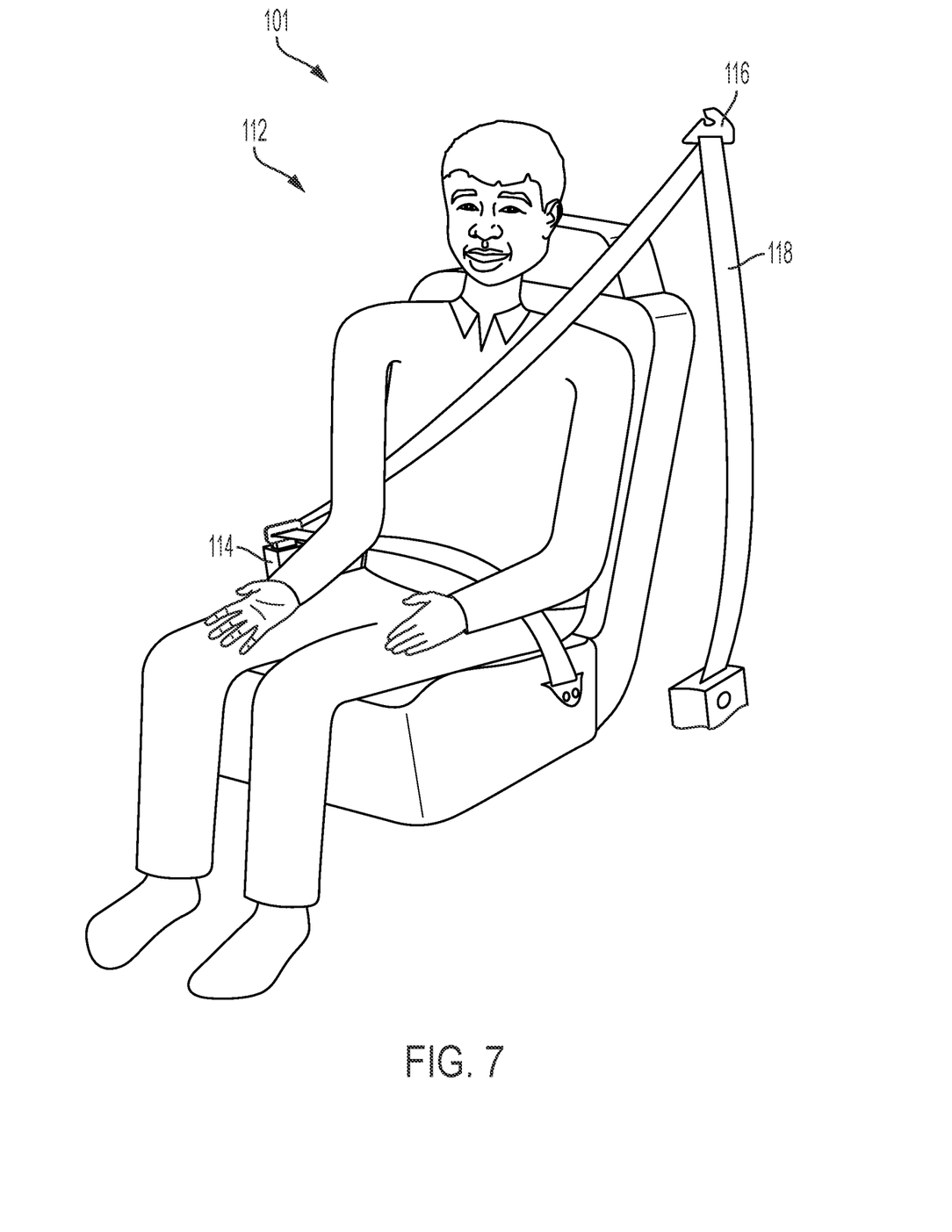
FIG. 7 illustrates a perspective view of the seatbelt being buckled and the seatbelt extender and the receiver in a retracted seat according to an aspect of the present disclosure.

Referring still to FIG. 2, with additional reference to FIGS. 3-7, the seatbelt assistance system 101 further includes a seatbelt assembly 112. The seatbelt assembly 112 is configured to adjust a seatbelt based on the profile (e.g., physical properties) of the passenger. For instance, the seatbelt assembly 112 is configured to adjust such that a senior passenger may more comfortably grasp and secure the seatbelt assembly 112, thereby improving ergonomics. The seatbelt assembly 112 may include a receiver 114 (e.g., a buckle), an extender 116, and a seatbelt 118 extending therebetween. The receiver 114 may be configured to move (e.g., adjust, extend out, reposition, etc.) away from a disengaged positioned (e.g., see FIGS. 3 and 4) so that the passenger may make the connection between the seatbelt 118 and the receiver 114 closer to the front or center of a body of the passenger. For instance, as illustrated in FIG. 5, the receiver 114 may extend to an engaged positioned such that the receiver 114 is extended proximally, relative to the passenger, such that the passenger can engage the seatbelt 118 with the receiver 114 without having to rotate the body as much as is required by a passenger when the receiver 114 is not extended. The seatbelt assistance system 101 then retracts the receiver 114 back to the disengaged position for operation during driving (e.g., see FIG. 7).

Similarly, the seatbelt assistance system 101 includes the extender 116. The extender 116 may be disposed on a ceiling of the vehicle 100. The seatbelt 114 is configured to be threaded through, or otherwise coupled to, the extender 116. Accordingly, the seatbelt 114 and the extender 116 may move (e.g., adjust, extend out, reposition, etc.) away from the disengaged position (e.g., see FIG. 3) together. For instance, as illustrated in FIG. 4, the extender 116 may move forward relative to the vehicle 100 to an engaged position such that the seatbelt 118 is moved toward a front of the body of the passenger such that the passenger can grab the seatbelt 118 without having to rotate the body as much as is required by a passenger when the extender 116 is not extended.

The seatbelt assembly 112 may have a motor 120. The motor 120 may be operatively coupled to the receiver 114 and/or the extender 116. Accordingly, the receiver 114 and the extender 116 are motorized, i.e., configured to be adjustable via the motor 120. In various embodiments, the receiver 114 and the extender 116 may be adjusted manually or automatically. In various embodiments, the motor 120 includes a plurality of motors. For instance, the receiver 114 and the extender 116 may each be coupled to a motor independent from the other. The motor 120 is configured to communicate with the ECU 102.

The ECU 102 may control the operation of the seatbelt assembly 112 based on the data detected by the sensor 108 and/or data received by the network access device. For example, the ECU 102 may determine that the passenger has entered the vehicle 100 and is positioned in a seat (e.g., see from FIG. 3 to FIG. 4). Further, the ECU may determine the passenger is a senior (e.g., years of age or older) and/or a related profile. For instance, the sensor 108 may detect physical properties indicative of a senior passenger or related profile. The physical properties may include body-shape, size, seat position, female or male body-type, range of motion, etc. The sensor 108 may be a camera configured to scan the passenger and transmit an image of the passenger to the ECU 102. The ECU 102 may receive the data and determine whether then physical properties of the passenger, as shown in the image, match the physical properties related to a senior as stored in the memory 104. For instance, the memory 104 may store at least one user profile. If the physical properties of the passenger do indicate a senior, for instance, the ECU 102 may send a signal to the motor 120 to activate (e.g., trigger, prompt, command, etc.) the motor 120. The receiver 114 and the extender 116 are then adjusted to the engaged position. By adjusting the reach of the seatbelt 118 when a senior or older occupant is present, the physical strain on such a passenger to successfully buckle the seatbelt 118 (e.g., see FIG. 6) is reduced.

In various embodiments, the seatbelt assistance system 101 may facilitate adjustments for passengers other than an older passenger or the like. For instance, the ECU 102 may be configured to determine, via the sensor 108 that a child, or a passenger under a threshold height has entered the vehicle 100. In various embodiments, the seatbelt assistance system 101 may be configured to adjust the seatbelt assembly 112 dynamically based on sensed occupant size, seat position, and range of motion. The physical properties may be pre-set for different passengers. In various embodiments, the physical properties may be input by the passenger via the I/O device 110 or a sensor may be able to scan or detect the physical properties of the passenger. In various embodiments, the user settings may also be set based on a preset configuration (e.g., manufacturer default value(s)) or manually set by a user (e.g., during training, set-up).

In various embodiments, the seatbelt assistance system 101 may utilize cameras, sensors, artificial intelligence/machine learning algorithms and/or various data available from, e.g., a cloud service (including crowd-sourced data), to determine the physical properties of the passenger. The ECU 102 may be configured to determine, via the artificial intelligence/machine learning algorithm, for instance, a range of mobility changing over time. For instance, the seatbelt assistance system 101 is configured to detect the physical properties (e.g., body shape/size), as described herein, and additionally is configured to detect more strain on the part of the user. The strain may be determined via audio or visual cues detected by the sensor 108. Following, the seatbelt assistance system 101 is configured to adjust the seat belt accordingly, to adapt over time to meet the user in their ideal range of motion. Accordingly, the receiver 114 and the extender 116 are configured to be adjustable via the motor 120 based on the learned user settings.

Figure 8:
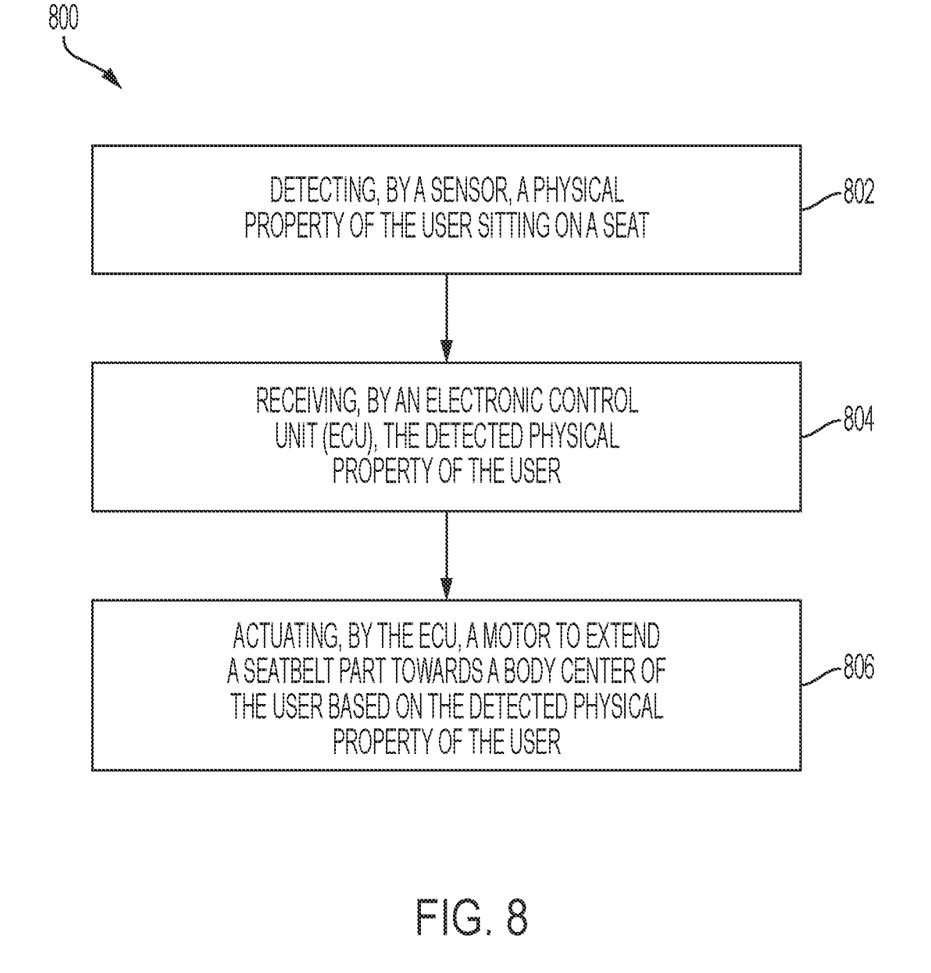
FIG. 8 illustrates a flow diagram of a method for putting a seatbelt on a user according to an aspect of the present disclosure.

Referring now to FIG. 8, a flow diagram of a method 800 for putting a seatbelt on a user is illustrated. At 802, a physical property of the user sitting on a seat is detected by a sensor (e.g., sensor 108). At 804, the detected physical property of the user is received by an electronic control unit (e.g., ECU 102). At 806, a motor (e.g., motor 120) receives an activation command by the ECU and is actuated to extend a seatbelt part (e.g., seatbelt 118 with corresponding extender 116) towards a body center of the user based on the detected physical property of the user. For instance, the ECU may associate the detected physical property of the user with a user profile (e.g., physical properties stored in a memory), and actuate the motor to extend the seatbelt part towards the body center of the user based on settings associated with the user profile. Further, method 800 may include detecting a position of the seat via a second sensor, and actuating the motor to extend the seatbelt part towards the body center of the user based on the position of the seat and the detected physical property of the user. Once the seatbelt is securely fastened, the ECU may command the motor to retract the seatbelt part, including the receiver and the extender, to an original position, or a disengaged position, of the seatbelt part.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle seatbelt system comprising:
a sensor configured to detect a physical property of a user sitting on a seat, the physical property of the user including a body shape of the user;
a motor configured to move a seatbelt part; and
an electronic control unit (ECU) coupled to the sensor and the motor and configured to:
receive data relating to the detected physical property of the user, and
command the motor to move the seatbelt part towards a body center of the user based on the detected body shape of the user.

2. The vehicle seatbelt system of claim 1, wherein the ECU is further configured to associate the data relating to the detected physical property of the user with a user profile and to command the motor to move the seatbelt part towards the body center of the user based on one or more settings associated with the user profile.

3. The vehicle seatbelt system of claim 2, further comprising a memory or a remote server configured to store data including the user profile and the one or more settings.

4. The vehicle seatbelt system of claim 2, wherein the one or more settings are determined by the ECU based on the user profile, user input, or an artificial intelligence (AI) or machine learning model.

5. The vehicle seatbelt system of claim 1, wherein the ECU is further configured to command the motor to move the seatbelt part towards the body center of the user based on a position of the seat and the detected physical property of the user.

6. The vehicle seatbelt system of claim 1, wherein the seatbelt part is a receiver or an extender.

7. The vehicle seatbelt system of claim 1, wherein the physical property of the user further includes a body size of the user.

8. The vehicle seatbelt system of claim 2, wherein the user profile includes age or range of mobility.

9. A vehicle comprising:
 a seatbelt assembly;
 a first sensor configured to detect a physical property of a user sitting on a seat, the physical property of the user including a body shape of the user;
 a second sensor configured to detect a position of the seat;
 a motor configured to move a part of the seatbelt assembly; and
 an electronic control unit (ECU) coupled to the first sensor, the second sensor, and the motor and configured to:
  receive first data relating to the detected physical property of the user,
  receive second data relating to the detected position of the seat, and
  command the motor to move the part towards a body center of the user based on the detected body shape of the user and the detected position of the seat.

10. The vehicle of claim 9, wherein the ECU is further configured to associate the first data relating to the detected physical property of the user with a user profile and command the motor to move the part towards the body center of the user based on one or more settings associated with the user profile.

11. The vehicle of claim 10, further comprising a memory or a remote server configured to store data including the user profile and the one or more settings.

12. The vehicle of claim 10, wherein the one or more settings are determined by the ECU based on the user profile or user input.

13. The vehicle of claim 9, wherein the part is a receiver or an extender.

14. The vehicle of claim 9, wherein the physical property of the user further includes a body size of the user.

15. The vehicle of claim 10, wherein the user profile includes age or range of mobility.

16. A method for putting a seatbelt on a user, the method comprising:
 detecting, by a sensor, a physical property of the user sitting on a seat, the physical property of the user including a body shape of the user;
 receiving, by an electronic control unit (ECU) coupled to the sensor, data relating to the detected physical property of the user; and
 actuating, by the ECU, a motor to extend a seatbelt part towards a body center of the user based on the detected body shape of the user.

17. The method of claim 16, further comprising associating, by the ECU, the data relating to the detected physical property of the user with a user profile and actuating, by the ECU, the motor to extend the seatbelt part towards the body center of the user based on one or more settings associated with the user profile.

18. The method of claim 17, further comprising determining, by the ECU, the one or more settings based on the user profile.

19. The method of claim 16, further comprising detecting, by a second sensor coupled to the ECU, a position of the seat and actuating, by the ECU, the motor to extend the seatbelt part towards the body center of the user based on the detected position of the seat and the detected physical property of the user.

20. The method of claim 16, further comprising actuating, by the ECU, the motor to retract the seatbelt part to an original position of the seatbelt part after the seatbelt is buckled.

* * * * *